United States Patent Office 2,733,253
Patented Jan. 31, 1956

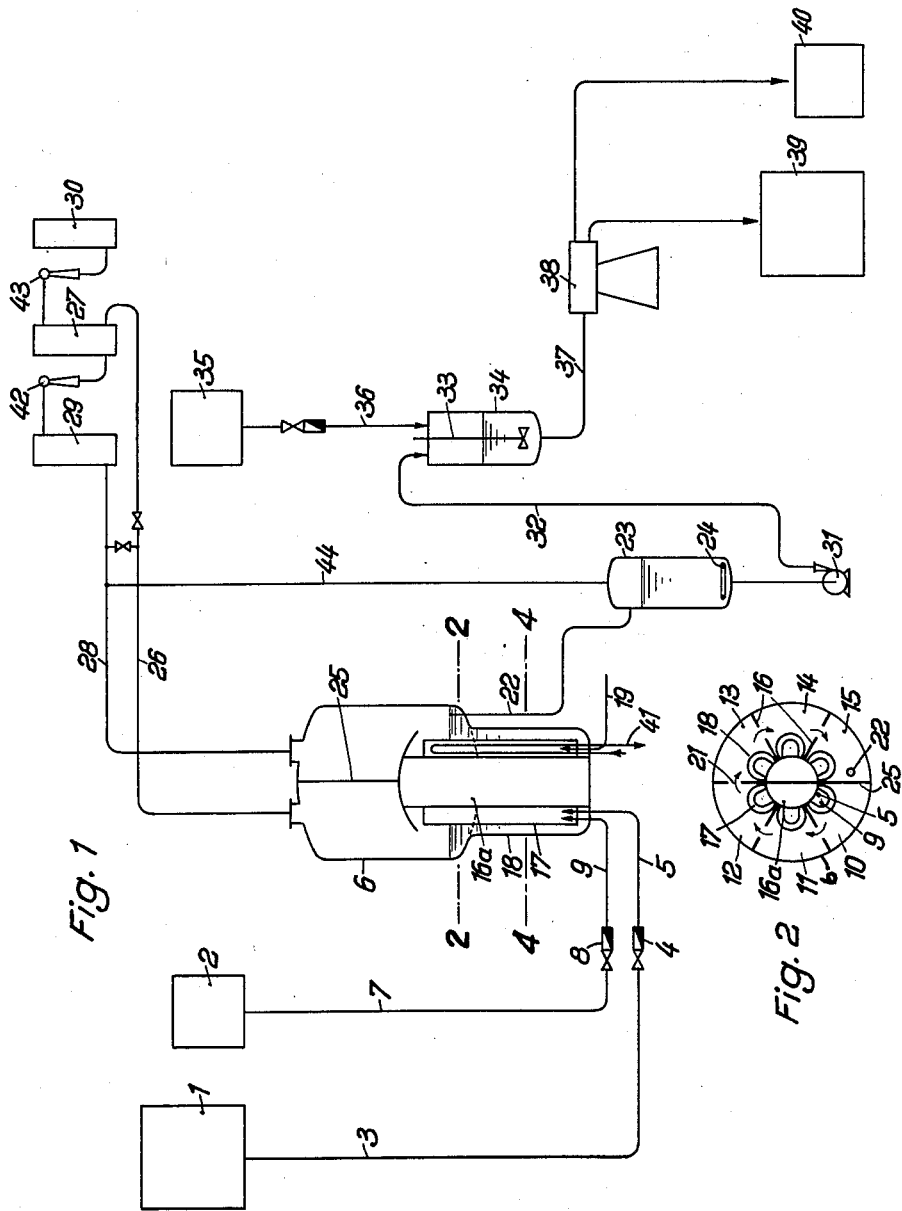

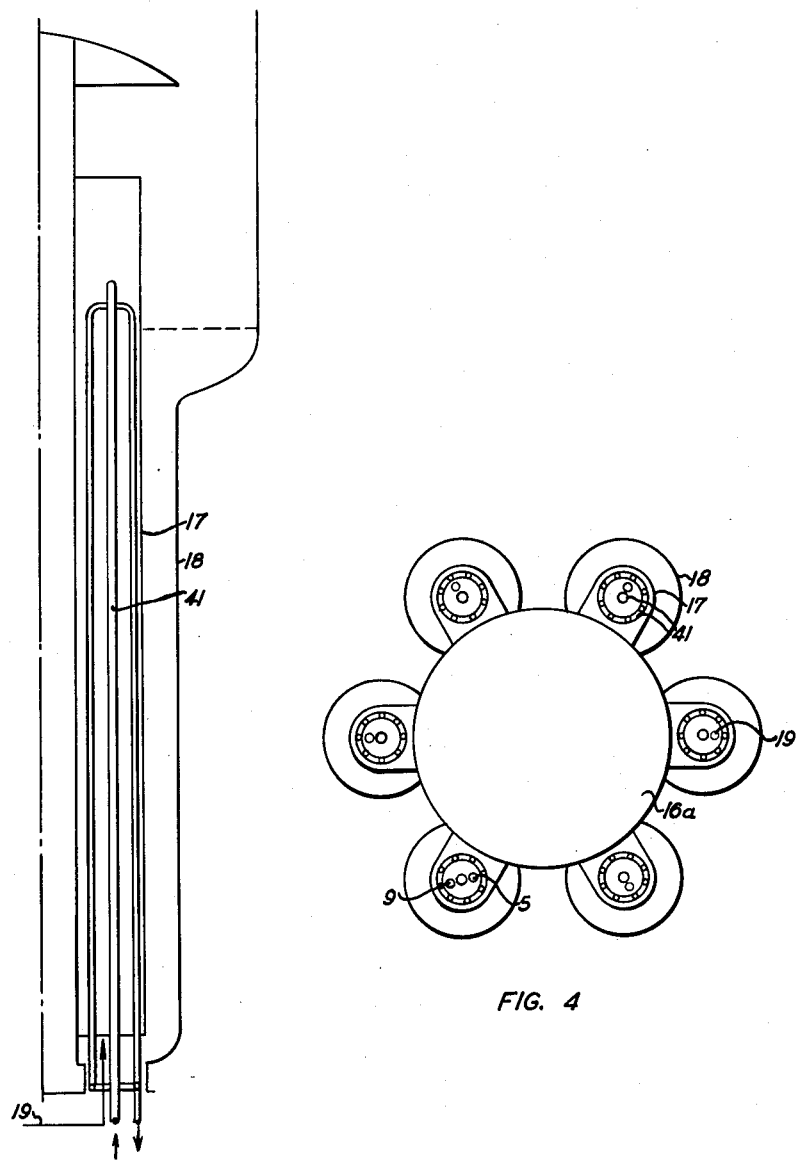

2,733,253

PROCESS OF AND APPARATUS FOR REFINING OILS OR FATS

Arthur Milbers, Bad Homburg vor der Hohe, and Karl Sondermann, Sprendlingen, Kreis Offenbach (Main), Germany, assignors to Metallgesellschaft Aktiengesellschaft, Frankfurt am Main, Germany, a corporation of Germany Application November 2, 1951, Serial No. 254,468

Claims priority, application Germany March 2, 1950

16 Claims. (Cl. 260—425)

This invention relates to a process of and apparatus for refining oils or fats.

The terms "oils" and/or "fats" used herein, are intended to include oils or fats of vegetable or animal origin, or the products of esterification produced from natural or synthetic fatty acids and glycerine, or acid waxes, such as spermaceti or beeswax or mixtures of two or more raw materials of the foregoing groups.

Many attempts have already been made to refine oils or fats of vegetable, animal or synthetic origin with alkalis by a continuous process which aims at separating out the free fatty acids, colouring matter, mucous and protein substances and the like. These continuous processes are still very elaborate and necessitate extensive and costly apparatus.

The present invention aims at substantially simplifying the continuous refining and the apparatus which are used therefor, whilst at the same time improving the yield of refined substances.

To this end, according to the invention, oils or fats are refined in a plurality of consecutive stages with alkalis, said oils or fats being of vegetable or animal origin, or the products of esterification, produced from natural or synthetic fatty acids and glycerine, or acid waxes, such as spermaceti or beeswax or the like, or mixtures of two or more members of these groups of raw materials or the like which are hereinafter collectively and briefly designated as "oil."

The oil is circulated in the form of a gas-permeated mixture, in each stage during which process it is led in a state of fine subdivision from the liquid to the gas chamber of each stage. The circulation and gas-permeation is effected according to the principle of the air-lift or mammoth pump, according to which the liquid to be conveyed flows into a vertical pipe, the riser pipe, which is open at the top and at the bottom and which dips into the liquid. The liquid is caused to ascend the pipe by means of a conveying medium introduced at the bottom of the pipe in the form of gas or vapour, for example, steam, carbon dioxide or the like, and is distributed in the gas chamber of the vessel on flowing out of the upper end of the pipe. This process will hereinafter be referred to as "circulation."

The refining stages, of which the process in accordance with the invention makes use, are advantageously combined in one apparatus, for example by dividing a container, for example, a cylindrical vessel into a suitable number of chambers by partitions, each of which is equipped with one circulation device and which are so connected with each other with respect to the passage of the liquid, that the oil is introduced into one chamber, treated in all the other chambers consecutively, and drawn off from the last chamber. The invention has the advantage that a very extensive and rapid neutralisation is achieved as a result of the continuous and thorough mixing of the oil and alkali solution. The amounts of oil treated in each stage can thus be kept comparatively small so that a comparatively small apparatus suffices also for large throughputs.

Heating and cooling appliances are advantageously provided in each circulation device so that the soap-oil mixture can be heated or cooled on its passage through the riser pipe. This renders it possible to maintain the desired temperatures in the individual stages or groups of stages. By way of example the process can be operated with a lower temperature in the initial stage or stages, and at increasing temperatures in the subsequent stages.

A further advantage of the invention consists in that the process can be carried out in vacuo. The process can then be carried out in such a manner that evaporation of water is initiated already in the first stage, or also only in the following stages, simultaneously with the saponification, the evaporation being controlled by suitably adjusting the temperature and the vacuum. Different degrees of vacuum can also be applied to the individual stages or groups of stages, for example the vapour or gas chamber of the refining vessels can be subdivided one or more times and the individual compartments thus formed can be subjected to different degrees of vacuum. The water can be evaporated to such an extent that an anhydrous soap or one containing only a little water is produced in the last stage so that hydrolysis of the soap, with the consequent increase in the amount of the free fatty acids in the oil, can be avoided. The solubility of the soap in the oil is thereby also reduced.

Caustic alkali solutions, alkaline earth hydroxides or alkali metal carbonates or mixtures of these substances can be used for the saponification. Ammonia or organic bases such as triethanolamine can also be used. As is known, especially good yields and high quality oils are obtained if alkali metal carbonate solutions are used, as the oil is not or only very slightly attacked by alkali metal carbonate solutions. The use of alkali metal carbonates per se or in admixture with other neutralising agents has the further advantage in the hereindescribed process of avoiding frothing, which is unavoidable with the known processes since all frothing is suppressed on the passage of the saponified oil mixture through the circulation devices.

The oil refined in accordance with the invention can be separated from the soap by known processes, for example by filtration or after the addition of water or salt solutions, which aims at separating the soap as soap stock. It has moreover been found that it becomes possible to separate the neutral oil from the dry soap by centrifuging. This separation can be effected by adding a concentrated salt solution to the mixture of oil and soap and using a centrifugal separator or similar rapidly rotating separating device which is capable of continuously separating very viscous or paste-like substances from liquids. Although centrifuges or the like of this kind are known per se it was hitherto impossible to utilise them for separating oil and dry soap, as this can only be achieved if a concentrated salt solution or liquids having a similar effect, for example alcohols or solutions of alkalis such as caustic soda or caustic potash solutions, or the like are added to the oil-soap mixture. The addition of a concentrated salt solution has the further advantage that the oil is obtained free from soap and that hydrolysis of the soap during separation remains repressed as a result of the added solution. As a result the oil recovered has a very low fatty acid content which is of the order of 0.03 to 0.5%. Solutions of sodium, potassium or ammonium chloride or sulphate, or similar alkali or alkaline earth salts can, for example be used as the concentrated salt solution. The concentration of these solutions can be kept at from about 5% up to saturation point. It is of especial significance that the use of a salt solution or the like results in a soap with a very low oil content, as the oil is apparently displaced from the soap by the salt or like solution. Thus soaps with an oil content of only about 15 to 20% referred to the dry soap can be obtained. Suitable mixtures comprising the hereinbefore described salts can also be added in order to enable or facilitate centrifuging, or a solution or an elutriate which contains one or more of these salts and at least one hydroxide, hydro-carbonate or carbonate of the alkali or alkaline earth metals. Centrifuging is advantageously carried out hot, for example at temperatures of 40 to 80° C. The most advantageous temperature in each case can be easily determined by experiment and is affected by, inter alia, the nature of the treated oil or fat. By way of example higher temperatures are employed for treating hard fats than for treating liquid oils or the like.

The separation of the dry soap from the oil by centrifuging can also be carried out in one or more stages. Thus for example, centrifuging can initially be so carried out that a soap stock with as small an oil content as possible is recovered, irrespective of the soap content of the separated oil. The oil is then again centrifuged so that the soap residue may be separated therefrom and an oil completely free from soap recovered. The soap separated from the oil during the second stage may accumulate a small oil content. There is however nothing to prevent the inclusion of still substantial amounts of oil in the soap recovered in the second stage, for example if the process is operated with a view to an especially careful removal of the soap from the oil. As much oil as possible can then be removed from this oil-soap mixture by centrifuging, for example in the first stage or separately. The process can however be also operated in the opposite manner in that an oil completely free of soap is initially separated and the mixture of oil and soap, if it still contains much oil, can then be centrifuged in a second stage.

A further addition of salt solution or the like can be made prior to the second stage, especially when it is desired to remove residual soap or a residual turbidness from the oil, as a result of which the removal of the residual soap is extraordinarily facilitated without any risk of an increase in the free fatty acid content of the oil.

The soap separated from the oil often solidifies to such an extent on cooling that it can be conveyed in the same manner as solid materials.

The separation of oil and soap by centrifuging with the aid of added substances which enable or facilitate the passage of soap through the centrifuge has shown itself to be so efficient that it can also be used with advantage for oil-soap mixtures other than those recovered by means of the hereindescribed process.

In order to enable the invention to be more readily understood, reference is made to the accompanying drawings which illustrate diagrammatically and by way of example one embodiment of apparatus suitable for carrying the invention into practical effect and in which:

Figure 1 is a flow sheet;

Figure 2 represents a section through an apparatus along the line 2—2 of Figure 1;

Figure 3 is a vertical section of the right-hand portion of refining vessel 6 shown in Fig. 1; and Figure 4 is a cross-section through the line 4—4 in Figure 1.

In said drawings, 1 and 2 denote storage vessels for the oil and alkali solution. The oil is passed through the line 3 to a metering device 4, and from thence through line 5 into the first chamber of the refining vessel 6. The alkali solution is introduced into the same chamber through line 7, metering device 8 and line 9. The neutralisation vessel consists of the chambers 10, 11, 12, 13, 14 and 15, which are formed in the vessel 6 by partitions 16 and a central pipe 16a. A circulation device is provided in each chamber which consists of a pipe 17 open at the top and at the bottom and a covering pipe 18 passing downwards from the bottom of the chamber and open at the top and closed at the bottom. The conveying medium for example steam is introduced at the bottom through the line 19; heat exchangers in the form of tubes 41 are provided in each riser pipe 17 which can be operated with suitable heating or cooling media, for example, steam. Figure 3 is a more detailed view of the construction of a portion of the refining vessel 6. There it is seen that the covering pipe, or individual covering pipes 18, collectively define the bottom and lower liquid holding portion of the vessel 6 and is actually the lower extension of vessel 6. The covering pipe 18 is shown open at the top end, thus forming a free liquid communication into the vessel 6, and closed at the bottom, thus forming the bottom for the vessel 6. Riser pipe 17 is shown as a vertical riser pipe, with the steam injection pipe 19 terminating at the bottom thereof. The heat exchange tubes 41 consisting of a central inlet pipe and a multiple number of radiating outlet pipes are best shown in Fig. 4 wherein is also shown member 18 which follows the contour of each of the riser pipes 17 and surrounds each such riser pipe, while the riser pipes themselves are shown surrounding the central pipe 16a.

The individual chambers communicate with each other through openings 21 in the chamber walls 16. The mixture of oil and soap is drawn out of the last chamber 15, which is closed so that there can be no direct passage of liquid to the first chamber 10, and is passed through line 22 to a separate receiver 23 provided with steam spray nozzles 24 or the like. Some of the chambers, for example, 10, 11 and 12, whose vapour spaces are closed against the remaining chambers by a wall 25, communicate with the condenser 27 of the vacuum installation through line 26 whereas the remaining chambers communicate with the condenser 29 of the same vacuum installation through line 28. The condensers 29 and 27 in which the steam which is formed during the refining process and introduced into the process as driving steam is condensed, are connected consecutively so that the condenser 29 can be vented into the condenser 27 by means of a jet ejector 42 and from thence by means of a jet ejector 43 into a barometric condenser 30 so that a higher vacuum is produced in the chambers connected to the condenser 29 than in those connected to the condenser 27. Oil and neutralising agent are continuously introduced into the initial chamber 10 of the neutralisation apparatus.

An intensive intermixing of the two liquids takes place as the neutralising agent and the oil are raised in the riser pipe of the first chamber in the refining vessel 6, and neutralisation of the free fatty acid commences immediately. Saponification continues in the second chamber into which the oil-soap mixture is passed from the first chamber and in which it is treated in the same manner. Saponification is carried to completion in the chambers 12, 13, 14 and 15 through which the oil-soap mixture then flows consecutively while being treated and circulated. The mixture of oil and soap or neutralising agent is heated by means of the heating devices provided in the riser pipes and in which, for example, steam acts as the heating medium, so that the water present or formed during the saponification is more or less extensively evaporated. As the final chambers are operated under a higher vacuum than the preceding chambers, efficient evaporation is also ensured towards the end of the treatment and the water can, in a given case, be very extensively evaporated. The mixture of oil and preferably dry soap which is passed out of the last chamber into the receiver 23 can be kept in motion therein by introducing steam so that no substantial charring of the oil and soap can take place. From the receiver 23 which can be connected to the vacuum installation through a line 44, the mixture is introduced into the mixing vessel 34 equipped with the stirrer 33, through line 32 with the aid of pump 31, into which mixing vessel the salt solution is introduced from the container 35 through the line 36. Intimate mixing of the oil-soap mixture and the salt solution takes place in the vessel 34 from which the mixture is passed to the centrifuge 38 through the line 37, where it is separated into a clear oil containing no soap and practically no fatty acid and a soap containing salt. The oil flows continuously into the container 39 out of the centrifuge while the mixture of soap and salt solution leaves the centrifuge as a dry paste and is passed to the container 40.

The plant can also be modified in that a mixture of oil and neutralising agent enters the initial chamber of the refining vessel. The neutralising agent can, however, also be introduced into the refining vessel at various points, for example when two different neutralising agents are employed such as caustic alkali and alkali metal carbonate. The mixture of oil and soap can also be worked up in such a manner that the soap is dissolved in an aqueous solution of alcohol, for example, ethyl or other water-soluble alcohol, and the oil then separated from the alcoholic soap solution in the centrifuge.

The invention will be illustrated by the following example.

*Example*

Rape seed oil containing 5% of free fatty acid was treated in the plant illustrated in the drawings with a 25% sodium carbonate solution using 10% in excess of the quantity theoretically necessary to saponify the free fatty acid present in the rape seed oil. The temperature in the initial chamber of the neutralising vessel 6 was 25° C., while the absolute pressure in the three initial chambers was maintained at 30 mm. mercury. The absolute pressure was decreased to 18 mm. mercury in the chambers 13, 14 and 15. Heat was introduced in each of the chambers by means of the heating devices.

The temperature remained at 25° C. up to the fourth chamber as a result of the evaporation. In the fifth and sixth chambers the temperature rose to 50° C. during the residual drying. The oil soap mixture was passed with this temperature into the mixer 34 through the receiver where it was mixed with 0.38% of a 15% sodium sulphate solution at the same temperature. The separation in the centrifuge then followed. A clear oil containing no soap and with a free fatty acid content of 0.03 and a paste-like soap were obtained. The soap had a neutral oil content of 16% referred to the paste, or 22% referred to the anhydrous salt-free soap mass.

We claim:

1. Process for refining an oil selected from the group consisting of vegetable fats, vegetable oils, animal fats, animal oils, synthetic fats, synthetic oils and mixtures thereof which comprises establishing a multiple number of series-connected zones including a first zone, at least one intermediate zone, and a last zone, forcing an oil with a neutralizing agent upward in the form of a gas-permeated mixture through a vertical path of flow by injecting a fluid along said path in said first zone, passing said oil and neutralizing agent through said intermediate zones to said last zone in series, forcing said oil with a neutralizing agent through an upward path of flow in the form of a gas-permeated mixture by injecting a fluid along said path in each said zone, and recovering oil from said last zone.

2. Process according to claim 1, which includes removing heat from said oil and neutralizing agent while being forced upwardly along at least one of said paths of flow.

3. Process according to claim 1, which includes heating said oil and neutralizing agent while being forced upwardly along at least one of said paths of flow.

4. Process according to claim 1, which includes maintaining said zones under vacuum.

5. Process according to claim 4, in which said zones closest to said last zone are maintained under a higher vacuum than said zones closest to said first zone.

6. Process according to claim 1, in which said neutralizing agent is selected from the group consisting of alkali metal carbonates, caustic alkalis and mixtures thereof.

7. Process according to claim 1, in which said oil and neutralizing agent is removed from said last zone and centrifugally separated.

8. Process according to claim 7, which includes adding a concentrated salt solution to the mixture prior to said centrifugal separation.

9. Process according to claim 1, which includes adding neutralizing agent in at least one other zone.

10. Process according to claim 1, in which said oil and neutralizing agent are forced upward through said vertical paths of flow by steam injection.

11. Apparatus for refining an oil selected from the group consisting of vegetable fats, vegetable oils, animal fats, animal oils, synthetic fats, synthetic oils and mixtures thereof which comprises a substantially enclosed vessel defining a lower liquid zone and an upper vapor zone, vertical partition means dividing said vessel into a multiple number of adajcently positioned chambers including a first chamber, a last chamber, and at least one intermediate chamber means for connecting the lower liquid zones of said chambers in series from said first chamber through said intermediate chamber and into said last chamber, separate vertical conduit means positioned in each said chamber extending from the lower portion of the liquid zone in each said chamber and terminating in the vapor zone of that chamber, means for injecting a fluid vertically upward into the lower portion of each said vertical conduit means, means for passing liquid into the vertical conduit means in said first chamber, and means for removing liquid from said last chamber.

12. Apparatus according to claim 11, which includes heat-exchange means positioned in at least one of said vertical conduit means.

13. Apparatus according to claim 11, in which said vessel is substantially cylindrical and in which said vertical partition means are radially positioned therein.

14. Apparatus according to claim 11, in which said means for injecting a fluid vertically upwardly into the lower portion of each said vertical conduit means are steam-nozzle means positioned in the lower portion of each of said vertical conduit means.

15. Apparatus according to claim 11 in which said means for connecting the lower liquid zones of said chambers in series are flow openings defined through said partition means.

16. Apparatus according to claim 11 in which said vessel is substantially cylindrical having a substantially cylindrical upper portion and a substantially cylindrical lower portion of smaller cross section than said upper portion and in which vertical partition means are radially positioned therein.

References Cited in the file of this patent

UNITED STATES PATENTS

| | | |
|---|---|---|
| 1,156,372 | Robinson | Oct. 12, 1915 |
| 1,204,069 | Robinson | Nov. 7, 1916 |
| 2,205,971 | Clayton et al. | June 25, 1940 |
| 2,631,159 | Keith | Mar. 10, 1953 |

FOREIGN PATENTS

| | | |
|---|---|---|
| 474,169 | Great Britain | Oct. 27, 1937 |